No. 762,409. PATENTED JUNE 14, 1904.
G. H. HILL.
SYSTEM OF MOTOR CONTROL.
APPLICATION FILED JUNE 25, 1902. RENEWED NOV. 3, 1903.
NO MODEL. 4 SHEETS—SHEET 1.

WITNESSES
INVENTOR
George H. Hill
by Bakewell & Byrnes
his Attorneys.

No. 762,409. PATENTED JUNE 14, 1904.
G. H. HILL.
SYSTEM OF MOTOR CONTROL.
APPLICATION FILED JUNE 25, 1902. RENEWED NOV. 3, 1903.
NO MODEL. 4 SHEETS—SHEET 2.

WITNESSES
L. A. Conners
H. M. Corwin

INVENTOR
George H. Hill
by Bakewell Byrnes
his attorneys.

No. 762,409. PATENTED JUNE 14, 1904.
G. H. HILL.
SYSTEM OF MOTOR CONTROL.
APPLICATION FILED JUNE 25, 1902. RENEWED NOV. 3, 1903.
NO MODEL. 4 SHEETS—SHEET 3.

WITNESSES

INVENTOR
George H. Hill
by Bakewell Byrnes
his Attorneys.

No. 762,409. PATENTED JUNE 14, 1904.
G. H. HILL.
SYSTEM OF MOTOR CONTROL.
APPLICATION FILED JUNE 25, 1902. RENEWED NOV. 3, 1903.
NO MODEL. 4 SHEETS—SHEET 4.

WITNESSES

INVENTOR
George H. Hill
by Banewell & Byrnes
his Attorneys

No. 762,409.

Patented June 14, 1904.

UNITED STATES PATENT OFFICE.

GEORGE H. HILL, OF GLENRIDGE, NEW JERSEY.

SYSTEM OF MOTOR CONTROL.

SPECIFICATION forming part of Letters Patent No. 762,409, dated June 14, 1904.

Application filed June 25, 1902. Renewed November 3, 1903. Serial No. 179,749. (No model.)

*To all whom it may concern:*

Be it known that I, GEORGE H. HILL, a citizen of the United States, and a resident of Glenridge, in the county of Essex and State of New Jersey, have invented a System of Motor Control, of which the following is a full, clear, and exact description, reference being had to the accompanying drawings, forming part of this specification, in which—

Figure 1:
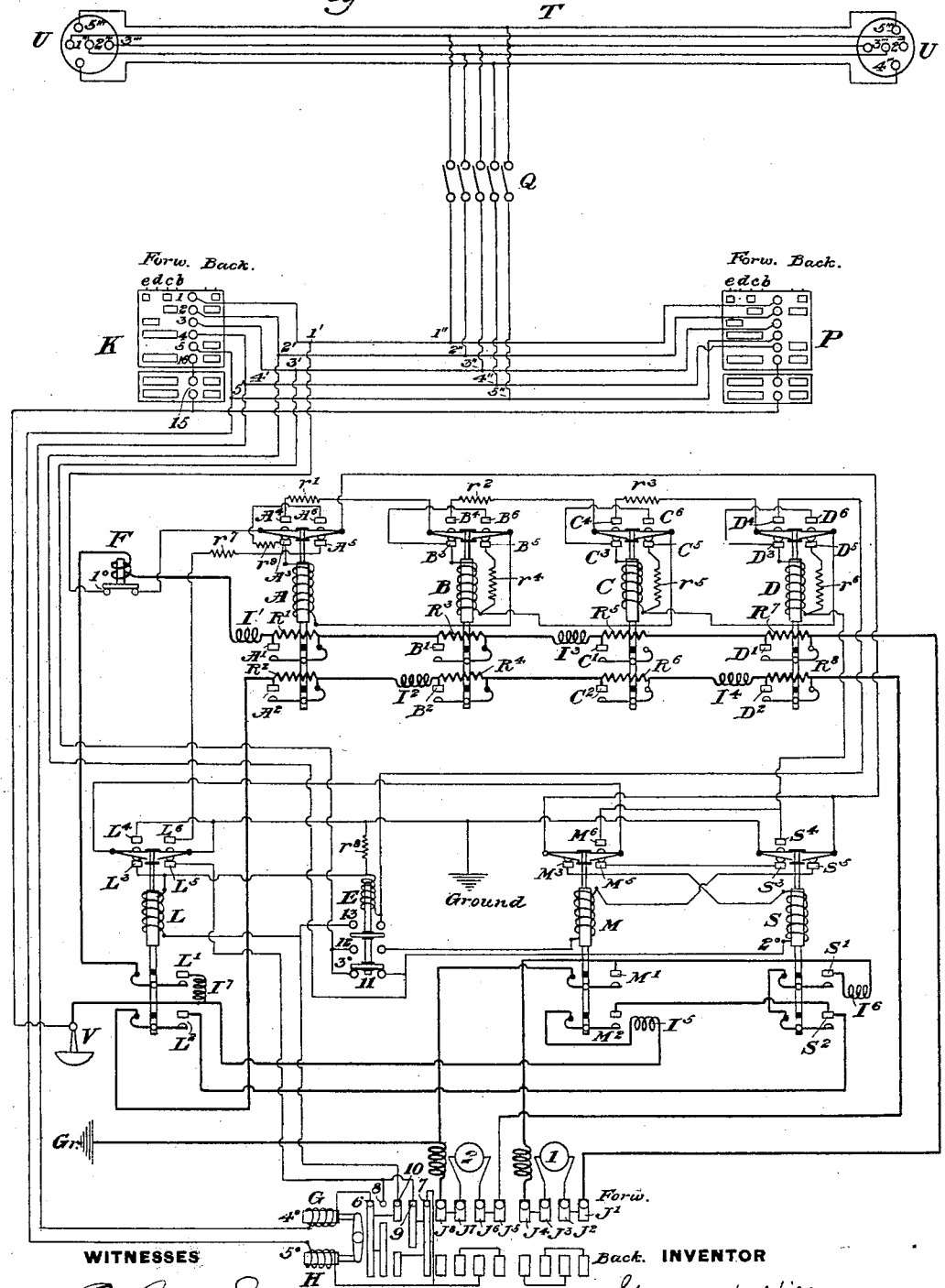
Figure 3:
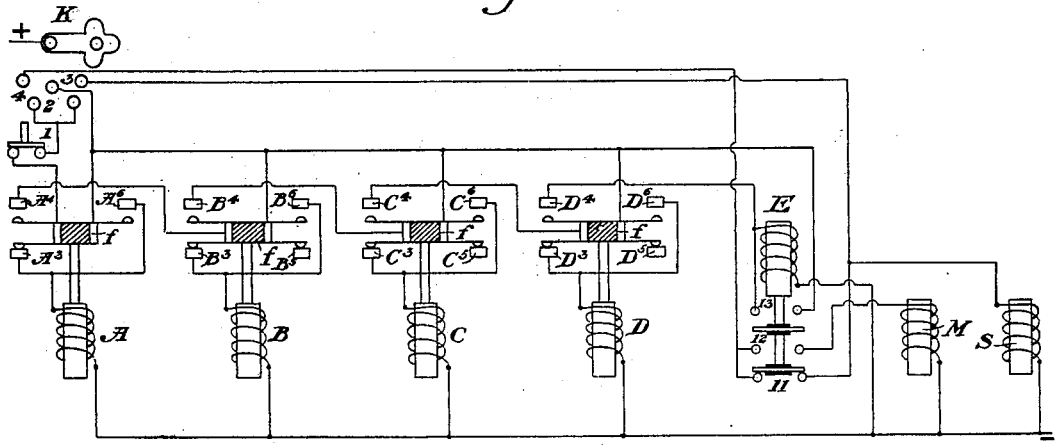
Figure 2:
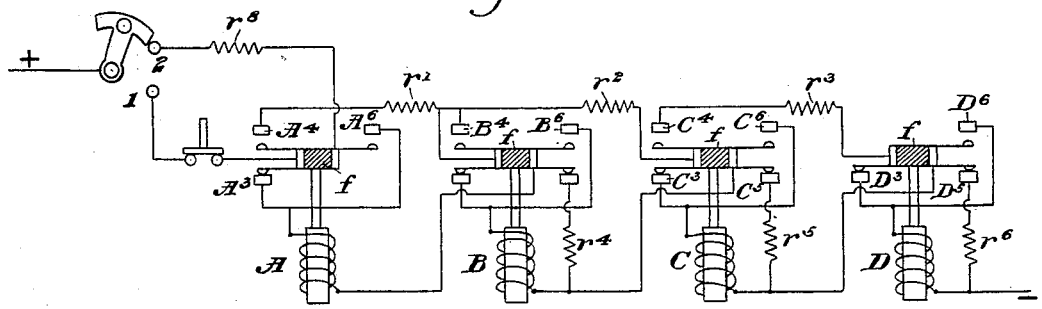
Figure 5:
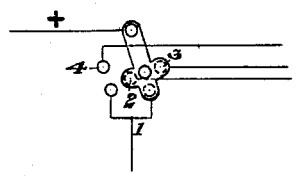
Figure 6:
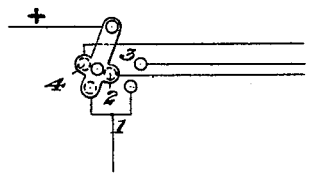
Figure 4:
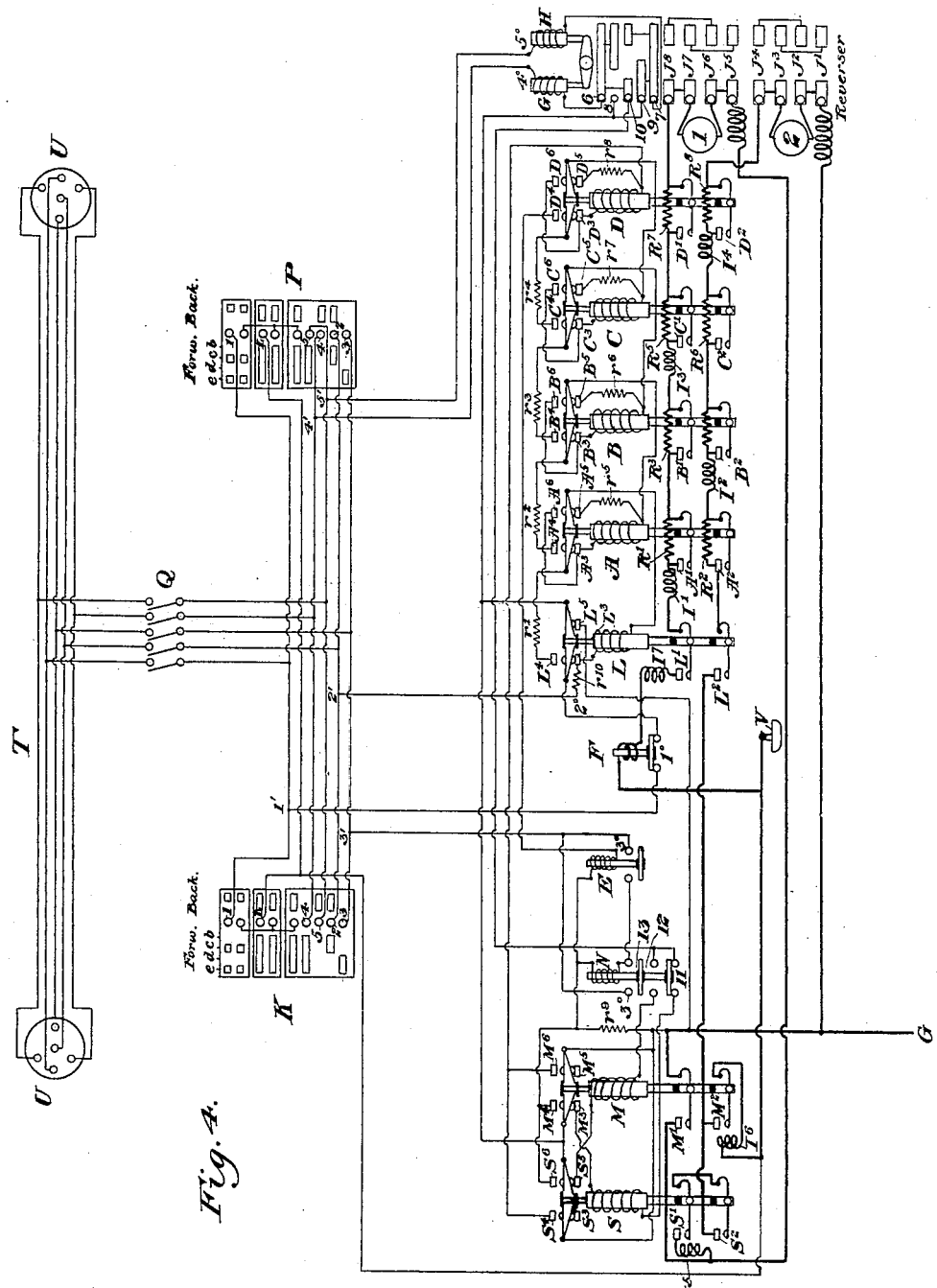
Figure 8:
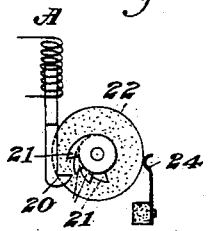
Figure 7:
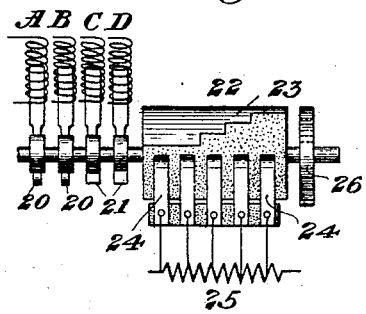
Figure 9:
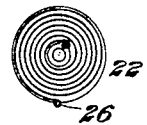
Figure 10:
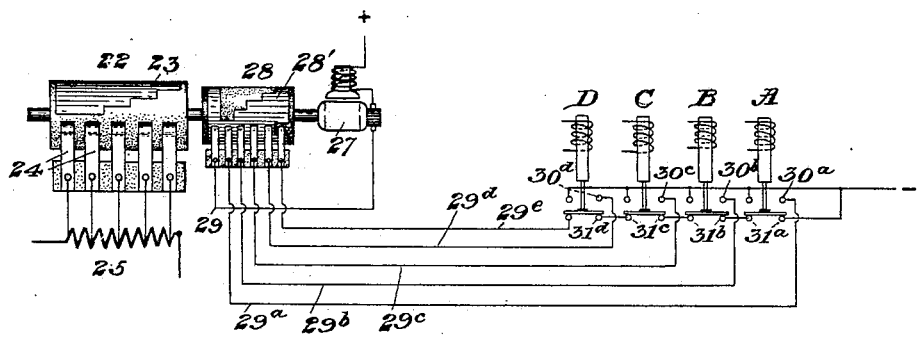

Figure 1 is a diagram of an apparatus embodying my invention. Fig. 2 is a detail view showing in simple form the controlling-magnets and their switches. Fig. 3 is a view illustrating a modification of my invention. Fig. 4 is a diagram of another modification. Figs. 5 and 6 are diagram views illustrating the operation of the master-switch. Figs. 7 and 10 are elevations illustrating in diagram two modifications of my invention. Figs. 8 and 9 are detail views of parts of the apparatus of Fig. 7.

In Fig. 1 I show the apparatus in connection with the train-line and couplers of the multiple unit system of train control which is described and claimed in the patent of Frank J. Sprague, No. 660,065.

My purpose is to provide a control apparatus in which the motors are controlled by successively-operated contact devices. The apparatus in its best form has the following characteristics which, in combination, I believe to be new, and some of which are also individually new. They render the control automatic and safe. Leading characteristics of the invention are—

First. A motor-control system in which the contact devices or power-actuated switches are automatically operated in succession and in which the progression may be stopped at any desired point. A controlling system comprising actuating means, and maintaining means is provided for controlling the operation of the contact devices. This controlling system serves to arrest the progression of the contact devices and to maintain the contact devices which have been already actuated. The controlling system is preferably so arranged that when one part of the system (the actuating means) is rendered inoperative the other part of the system, (the maintaining means,) which holds the contacts closed after they have been actuated, is unaffected. Provision is thus made for checking the cutting out of resistance at any desired point by a movement of the master controlling device, and the motorman can operate at any speed he desires independently of the automatic progression. This checking is accomplished by positive means at the master controlling device.

Second. Provision for insuring the progression of the control first in series and then in multiple relation of the motors through the successive resistance steps at all times, even though the motorman throw the handle of the master controlling device directly to its full multiple position.

In the particular embodiment of my invention which I have illustrated in my present application the controlling system is electrical in its character and consists of actuating and maintaining circuits through which current is supplied to electromagnets which operate the switches or contact devices. The arrangement of the circuits and switches shown in Fig. 1 is as follows: A, B, C, and D are electromagnets operating switches or contacts $A'$ $A^2$ $B'$ $B^2$ $C'$ $C^2$ $D'$ $D^2$, each contact bridging a resistance $R'$ $R^2$ $R^3$ $R^4$, &c., in the motor-circuit. S and M are magnets operating the main contacts $S'$ $S^2$ $M'$ $M^2$, which effect the series and parallel connections of the motors. L is a magnet operating contacts $L'$ and $L^2$, which open and close the motor-circuit. E is the automatic multiple governing magnet or relay which controls the contacts 11, 12, and 13 in the circuits of the controlling-magnets. Besides controlling the main contacts above noted the magnets A, B, C, D, S, M, and L also control the small contacts or auxiliary switches $A^3$ $A^4$ $A^5$ $A^6$ $B^3$ $B^4$, &c., which are in the circuits of the controlling-magnets. Compensating resistances $r'$ $r^2$, &c., are provided in the controlling-magnet circuits. F is a throttle-magnet whose coil is in the motor-circuit and which controls the contact $1^0$ in the actuating-circuit of the magnets. Its function is to interrupt the actuating-circuit of the controlling-magnets automatically when the current in the motor-circuit exceeds a predetermined value. $I'$ $I^2$ $I^3$, &c., are blow-out magnets for rupturing the arcs at the various motor-contacts. G and H are magnets operating the reverser-contacts $J'$, $J^2$, $J^3$, $J^4$, $J^5$, $J^6$, $J^7$, and $J^8$, which connect the motors for forward or backward movement. 6, 7, 8, 9, and 10 are contacts in the circuit of the controlling-magnets operated by the reverser-magnets G and H. K and P are master-switches at the ends of the car, either one of which may be used to control the operation of the system. Q is a cut-out switch connecting the circuits of the master-switches with the train-line T, which terminates at each end of the car with the couplers U U. By connecting the couplers on successive cars by suitable jumpers a number of cars can be operated from any master-switch on any car.

The operation is as follows: Suppose the master-switch K to have its handle moved so that its contacts are in the first forward position, (marked $b$.) Current then flows from the sliding contact V through contacts 15 and 16 out 4, branching at 4', part passing through 4" through cut-out switch Q and couplers U to other cars and part passing to $4^0$ through reverser-magnet G, to 6. Fig. 1 of the drawings shows the reverser moved into its "forward" position. If it were in its back position, the current would pass from 6 out to 8 to $L^5$, to ground. The reverser-magnet G would thus be energized and move the reverser to its forward position, as shown. In doing so 8 moves off its contact and 10 onto its contact, and current passes from 6 out 10 through magnet L, contacts $L^3$, $M^5$, and $S^3$, to ground. Magnet L is thus energized and closes its contacts $L'$ $L^2$ $L^4$ $L^6$ and opens $L^3$ and $L^5$. When $L^3$ opens, current passes from the magnet L through resistance $r^8$, to ground. These movements establish another circuit as follows: from the contact 16 at the master-switch out 2, branching at 2', part going through 2" to other cars and part to $2^0$ through magnet S, contact $M^3$, contact $A^5$, resistance $r^7$, contact $L^6$, to ground. Magnet S then closes its contacts $S'$ $S^2$ $S^4$ and opens $S^3$ and $S^5$. Closing $S'$ and $S^2$ completes the circuit through the main motors in series as follows: from the sliding contact or trolley V, blow-out $I^7$, contact $L'$, throttle-magnet F, blow-out $I'$, resistance $R'$ $R^3$, blow-out $I^3$, resistance $R^5$ and $R^7$, reverser-contacts $J'$ $J^2$, armature of motor No. 1, contacts $J^3$ and $J^4$, field of motor No. 1, blow-out $I^6$, contacts $S'$ $S^2$ $L^2$, resistance $R^2$, blow-out $I^2$, resistances $R^4$ $R^6$, blow-out $I^4$, resistance $R^8$, reverser-contacts $J^5$ $J^6$, armature of motor No. 2, reverser-contacts $J^7$ $J^8$, field of motor No. 2, to ground. Nothing further takes place until the handle of the master-switch K is moved. If it is moved in advance direction to place its contacts in position $c$, the circuits above described are not immediately affected; but another circuit, which I call the "controlling-magnet-actuating" circuit, is established as follows: from contact 16 out 1 at master-switch K, branching at 1', part going to other cars and part through contact $1^0$ through contact $A^3$, magnet A, contact $B^5$, resistance $r^4$, contact $C^5$, resistance $r^5$, contact $D^5$, resistance $r^6$, contact $S^4$, to ground. Magnet A is thus energized, closing contacts $A'$ $A^2$, thus bridging the resistance $R'$ $R^2$ and closing the contacts $A^4$ and $A^6$ and opening contacts $A^3$ $A^5$. Opening the contact $A^5$ and closing $A^6$ causes the circuit already traced from master-switch contact 2 through magnet S to be shifted from $A^5$ to $A^6$, thus establishing what I call the "maintaining-circuit" of the controlling-magnets, and current then passes from contact $M^3$ through contact $A^6$, resistance $r^9$, magnet A, contact $B^5$, resistance $r^4$, contact $C^5$, resistance $r^5$, contact $D^5$, resistance $r^6$, contact $S^4$, to ground, thus maintaining the magnets S and A energized and holding the contacts $S'$ $S^2$ $S^4$ $A'$ $A^2$ $A^4$ $A^6$ closed. Opening the contact $A^3$ and closing $A^4$ causes circuit from contact 1 of the master-switch to be shifted from $A^3$ (in the actuating-circuit) to $A^4$, (also in the actuating-circuit,) and current passes from contact $1^0$ through contact $A^4$, resistance $r'$, contact $B^3$, magnet B, contact $C^5$, resistance $r^5$, contact $D^5$, resistance $r^6$, contact $S^4$, to ground. This energizes the magnet B, and it lifts, provided that the bridging of the resistances $R'$ $R^2$ has not produced such an increase of current through the motors as to cause the throttle-magnet F to lift, opening its contact $1^0$, and thus opening the actuating-circuit and preventing the energizing of magnet B. When the motors have speeded up sufficiently to diminish the current to the normal volume, the throttle-magnet F closes the contact $1^0$, and the magnet B is energized, as above traced, and closes its contacts $B'$ and $B^2$, thus bridging the resistances $R^3$ $R^4$, and also closes $B^4$ and $B^6$ and opens $B^3$ and $B^5$. Opening $B^5$ and closing $B^6$ shifts the magnet B into the maintaining-circuit with magnets A and S, and by opening $B^3$ and closing $B^4$ the actuating-circuit is thus shifted from 1 on the master-switch to resistance $r^2$ and magnet C. If the flow of current through the motors is increased above the normal amount by bridging the resistances $R^3$ and $R^4$, the magnet F again lifts and interrupts the actuating-circuit without interrupting the maintaining-circuit. When the current diminishes, the magnet F drops and reëstablishes the actuating-circuit, which energizes the magnet C. These operations proceed until all the magnets A, B, C, and D have been successively raised and all the resistances $R'$ to $R^8$ have been bridged and the magnets A B C D shifted successively from the actuating-circuit to the maintaining-circuit, each magnet being included in the actuating-circuit by the preceding magnet and by its own movement being shifted from the actuating-circuit to the maintaining-circuit. The actuating-circuit and the maintaining-circuit are not in the controlled main motor-circuit, but are in shunt thereto or independent thereof. It is plain that if at any time during the progressive operation of the magnets A B C D the motorman moves the master-switch back to the position $b$ far enough to open the contact at 1 and interrupt the actuating-circuit, but not far enough to bring the switch to off position and open the circuit at 2, the maintaining-circuit above traced from contact 2 through the magnet S will cause those of the magnets A B C D which have already been operated to be maintained, but the actuating-circuit from 1 being interrupted the progression of the magnets will stop until the motorman again closes the master-switch contact 1. The motorman is thus enabled to stop the progression of the magnets and the cutting out of resistance at any part of the cycle of operation. The operation of the last magnet D of the set of controlling-magnets automatically controls the circuit for the multiple switch, so that until all of the controlling-magnets have been operated and the motor-circuits carried through the complete cycle from off position to the position of no resistance with motors in series the multiple switch cannot be actuated and also that before it can be actuated the controlling-magnets are brought to off or full resistance position and the circuit of the motor preferably interrupted. This is an important provision and is preferably accomplished as follows: When the magnet D moves and closes its contacts $D^4 D^6 D' D^2$, the current in the actuating-circuit passes from 1 through $1^0$, contact $A^4$, resistance $r'$, contact $B^4$, resistance $r^2$, contact $C^4$, resistance $r^3$, contact $D^4$, magnet E, resistance $r^8$, to ground. The multiple governing-magnet E is thus energized and closes its contacts 12 and 13 and opens 11. In closing 13 the magnet E is placed in shunt with the magnet L. If now the master-switch handle is moved to its multiple position $d$, the movement of the contact 2 on the switch breaks the circuit through said contact. This causes the magnets S, A, B, C, and D to drop, opening their respective contacts and the motor-circuit. When S and A have dropped, circuit is made from the master-switch, and current passes from contact 16 out 3, branching at $3'$, part going to other cars and part to $3^0$ through contact 12 on magnet E (which has not dropped with the other magnets since it is in shunt with the magnet L and divides its current with it) to magnet M, contact $S^5$, contact $A^5$, resistance $r^7$, contact $L^6$, to ground. Magnet M then closes its contacts. Closing of contacts $M'$ and $M^2$ closes the circuit through the motors in multiple relation as follows: from the sliding contact or trolley V, blow-out $I^7$, contact $L^7$, throttle-magnet F, blow-out $I'$, resistances $R' R^3$, blow-out $I^3$, resistances $R^5$ and $R^7$, reverser-contacts $J' J^2$, armature of motor No. 1, contacts $J^3 J^4$, field of motor No. 1, contact $M'$, to ground; also, from sliding contact V, blow-out $I^5$, contacts $M^2 L^2$, resistance $R^2$, blow-out $I^2$, resistances $R^4$ and $R^6$, blow-out $I^4$, resistance $R^8$, reverser-contacts $J^5 J^6$, armature of motor No. 2, reverser-contacts $J^7 J^8$, and field of said motor, to ground. If the handle of the master-switch is now moved to its extreme multiple position $e$, the same cycle of operations takes place as above described, with reference to the series relation of the motors, resulting in the successive actuation of the magnets A B C D under the automatic governing of the throttle F, gradually cutting out the motor-resistances $R'$ to $R^8$, the controlling-magnets being shifted successively from the actuating-circuit to the maintaining-circuit, each magnet being included in the actuating-circuit by the preceding magnet and by its own movement being shifted from the actuating-circuit to the maintaining-circuit. At any time during the progression of the magnets while the motors are in multiple the motorman may check the progression at will by moving the master-switch back from the position $e$ to the position $d$, for by so doing the actuating-circuit from contact 1 is interrupted, but the maintaining-circuit from the contact 3 through magnet S being unaffected holds in action the magnets which have already been actuated.

The above complete cycle of operations, first in series then in multiple, will always take place even though the master-switch handle is moved directly from off position to full multiple. If the motorman should throw the handle quickly to full-multiple position $e$ without pausing at the series position, the reverser and the magnet L would be operated. Then current would pass from contact 3 on the master-switch to $3^0$ through contact 11 to magnet S, &c., as first described. The cycle of automatic operations in such case is first to put the motors in series relation, successively operate the controlling-magnets, gradually cut out the resistances from the motor-circuit, energize the multiple governing-magnet E, interrupt the maintaining-circuit of the controlling-magnets, release the said magnets and restore them to their original position, open-circuit the motors, actuate the multiple magnet, and thus place the motors in multiple relation with all resistances in. The actuating-circuit of the controlling-magnets is then reestablished, causing the said magnets to progress with shifting from actuating-circuit to maintaining-circuit in multiple, as in series relation of the motors, gradually cutting out the resistances for the motor-circuit with like safety and precision, as if the motorman had moved the handle gradually through its successive steps. The entire cycle is subject to the automatic control of the throttle-magnet F, which interrupts the actuating-circuit of the controlling-magnets and of the multiple governing-magnet whenever the motor-current exceeds the normal volume. It is also subject, as above explained, to the action of the master-switch, by which the motorman can at any time interrupt the actuating-circuit without interrupting the maintaining-circuit. When the master-switch handle is brought to off position, all control-circuits are broken, all magnets return to their original position, and the motor-circuit is opened. The reverser is shown as being of the closed-circuit type and does not open its contacts when the magnets are deënergized, but remains in its last moved position, and, as will be seen, the reverser-contacts must be in or moved to the position indicated by the master-switch handle before current can be admitted to the magnet L or the other operating-magnets.

In Fig. 2 I show a convenient construction of the contacts of the controlling-magnets. The plunger of each magnet carries an insulating-block $f$, to which the movable contacts are attached. In this simplified figure and in Fig. 1 I show the resistances $r'$, &c., in the circuits of the controlling-magnets. They are for the purpose of maintaining the total resistances of these circuits at a constant value during the successive actuation of the magnets. Thus as the actuating-circuit is shifted from the magnet A to magnet B the resistance $r^4$ is cut out and equivalent resistance $r'$ is cut into the circuit, and as the circuit is shifted from magnet B to magnet C the resistance $r^5$ is cut out and an equivalent resistance $r^2$ is cut into the circuit, and so on. The resistance $r^8$ is placed in the maintaining-circuit in order to reduce the value of the current in this circuit below that of the actuating-circuit. This keeps the current required for the control-circuits as small as possible and prevents heating of the coils. When the magnet B is included in the maintaining-circuit, the resistance $r^4$ is excluded, and when the magnet C is included in the maintaining-circuit the resistance $r^5$ is excluded, &c.

In Fig. 3 I show the magnets A B C D and the actuating-circuit and maintaining-circuit therefor in a simpler form. The actuating-circuit for each magnet passes directly to ground from the magnet instead of passing through the switch-contact of the other magnets, and the maintaining-circuit extends from each magnet when it is actuated directly to ground and does not extend through the successive magnets in series, so that when all the magnets have been actuated and are in the maintaining-circuit they are in parallel relation to each other. In this figure I also show magnets corresponding to the series and multiple magnets S and M and the multiple governing-magnet E.

In Fig. 4 I show a modification of the apparatus. Like symbols are used to refer to like parts, as in Fig. 1. The magnets S or M are actuated and maintained by the circuits through the magnets of the reverser G or H subject to the multiple governing-magnets E and N, and the magnets L, A, B, C, and D are operated by the actuating-circuit and act successively, each being put in the actuating-circuit by the preceding magnet and when moved being shifted to the maintaining-circuit, as described with reference to Fig. 1. In Fig. 1 in passing from the series relation to the multiple relation of motors I show the motor-circuit opened by the contacts of the magnet S only, the contacts of the magnet L then remaining closed; but in Fig. 4 I show the contacts both of the magnet S and the magnet L adapted to be opened at this time. I thus secure greater ease of operation and smaller arcs in opening the circuit.

It will be understood by those skilled in the art that within the principle of my invention as defined in my broader claims the skilled electrician will be able to modify the parts of the apparatus and the arrangement of the circuit in many ways.

Instead of connecting the plungers of the several magnets with individual resistance bridging-contacts, as above described, I may employ a single rheostat-cylinder of ordinary construction and provide each of the plungers with a pawl engaging a ratchet on the shaft of said cylinder so that as each plunger is raised it will impart to the cylinder a motion of certain definite extent, cutting out a certain amount of resistance from the motor-circuit. Such cylinder may be provided with a spring which will restore it to its "off" position when the controlling-magnets are deënergized by interruption of their circuit. This is illustrated in Figs. 7, 8, and 9. The plungers of the magnets A B C D have pawls 20 adapted to engage, respectively, ratchet-teeth 21 on the shaft of the rotary cylinder-switch 22. This switch carries contact-plates 23, adapted to engage stationary contact-fingers 24, and thus to short-circuit successively portions of the resistance 25 of the main motor-circuit. 26 is a spring by which the switch 22 is returned to its off position when the magnets are deënergized. The ratchet-teeth 21 are set on the shaft at different angles, and as the magnets are successively energized they engage the appropriate ratchet-teeth and turn the switch forward one step, thus cutting out a portion of the resistance. The arrangement of the circuits by which the magnets are operated is the same as above described with reference to the other figures of the drawings.

A further modification of my invention is to substitute for the separate resistance bridging contacts of the motor-circuit a rheostat-cylinder operated by a pilot-motor or other electromagnetic device. In such case the controlling-magnets are provided with the actuating-circuit and maintaining-circuit above described. Each of the plungers of the magnet operates as a relay to control a circuit leading to the pilot-motor, and in each circuit there is a limit-contact operated by the pilot-motor and adapted to open the circuit thereof when the pilot-motor has progressed to a certain definite extent. I show this in Fig. 10, in which 22 is a cylinder-switch having plates 23. 24 are contact-fingers, and 25 the resistances of the main motor-circuit, portions of which are short-circuited as the fingers 24 are successively brought into contact with the plates of the switch. 27 is a pilot-motor whose armature is connected to the shaft of the switch 22 and to the shaft of a rotary cylinder limit-switch 28 and is adapted to rotate these switches. The limit-switch 28 carries plates 28′, adapted to engage successively contact-fingers connected with wires 29 29ª, &c. The wire 29 is directly in the circuit of the pilot-motor, and the other wires lead, respectively, to contacts 30ª, &c., operated by the magnets A B C D, which magnets are connected and operated as shown on Sheets 1, 2, and 3 of the drawings. When the magnet A is energized, it closes the circuit at 30ª and current flows from the pilot-motor 27 through the wire 29, switch 28, wire 29ª, and contact 30ª to —. The circuit is thus completed through the pilot-motor, and it drives the switches 22 and 28 until the contact of wire 29ª passes off the plate 28′, which opens its circuit and stops the pilot-motor. When the magnet B is energized, the contacts 30ᵇ are closed, the circuit through the pilot-motor again closed, and the pilot-motor drives the switches until again stopped by the passing of the finger of the wire 29ᵇ from the plate 28′. Operation of the magnets C and D causes the rotation of the pilot-motor through definite steps in like manner. When all the magnets are deënergized, the circuit is closed through the pilot-motor, contacts of wires 29 and 29ᵉ, contacts 31ᵈ 31ᶜ, &c., to —. The pilot-motor then drives the switches 22 28 until the contact-finger of the wire 29ᵉ passes from the plate 28′, when the pilot-motor stops, leaving the switch 22 in its off position. (Shown in Fig. 10.)

I claim—

1. In a system of electrical control, the combination of a group of successively-acting magnets, means for effecting their automatic progression, a master-switch, and circuits controlled by the master-switch and adapted to arrest the progression of the magnets and to maintain the magnets already actuated; substantially as described.

2. In a control system for electric motors, the combination of a number of successively-operating magnets, resistance mechanism moved thereby, a multiple switch and its magnet, and means actuated with one of the resistance-operating magnets and arranged to control the circuit of the multiple-switch magnet; substantially as described.

3. In a control system for electric motors, the combination of a number of successively-operating magnets, individual resistance bridging contacts moved thereby, a multiple switch and its magnet, and means actuated with one of the resistance-operating magnets and arranged to control the circuit of the multiple-switch magnet; substantially as described.

4. In a control system for electric motors, the combination of a number of successively-acting magnets, resistance in the motor-circuit controlled thereby, multiple and series magnets adapted to connect the motors in parallel and series relation, a master-switch, a multiple governing-magnet controlling the circuit of the multiple magnet, and means adapted to close the circuit of the multiple governing-magnet at a definite part of the cycle of operation of the successively-acting magnets, whereby the movement of the master-switch from off position to multiple position will cause the operation of the successively-acting magnets before the operation of the multiple magnet; substantially as described.

5. In a control system for electric motors, the combination of a number of successively-acting magnets, resistance in the motor-circuit controlled thereby, multiple and series magnets adapted to connect the motors in series and parallel relation, a master-switch, a multiple governing-magnet controlling the circuit of the multiple magnet, means adapted to close the circuit of the multiple governing-magnet at a definite part of the cycle of operation of the successively-acting magnets, whereby the movement of the master-switch from off position to multiple position will cause the operation of the successively-acting magnets before the operation of the multiple magnet, and a magnet energized by the motor-circuit and adapted to interrupt the circuit of the controlling-magnets when the current in the motor-circuit exceeds a desired amount; substantially as described.

6. In a control system for electric motors, the combination of a number of successively-acting magnets, resistance in the motor-circuit controlled thereby, multiple and series magnets adapted to connect the motors in series and parallel relation, a master-switch, a multiple governing-magnet controlling the circuit of the multiple magnet, and means adapted to close the circuit of the multiple governing-magnet operated with the last of the said successively-acting magnets, whereby the movement of the master-switch from off position to multiple position will cause the operation of the successively-acting magnets before the operation of the multiple magnet; substantially as described.

7. In a control system for electric motors, the combination of a number of magnets controlling contacts in the motor-circuit, a master-switch, a plurality of circuits for the magnets individually controllable by the master-switch and adapted to be connected thereby with a source of supply of current, and means adapted automatically to include the magnets in one of the said circuits and to shift each magnet when it has operated to the other circuit; substantially as described.

8. In a system of electrical control, the combination of a master-switch, a number of resistance-controlling magnets, an actuating-circuit and a maintaining-circuit for the magnets individually controllable by the master-switch, and means whereby the magnets are successively included in the actuating-circuit and shifted to the maintaining-circuit; substantially as described.

9. In a system of electrical control, the combination of a hand-switch, a number of resistance-controlling magnets, an actuating-circuit and a maintaining-circuit for the magnets both leading from the hand-switch, and switches operated with the magnets and arranged to include them successively in the actuating-circuit and to shift them to the maintaining-circuit when they have been so actuated; substantially as described.

10. In a control system for electric motors, the combination of a number of magnets controlling contacts in the motor-circuit, a plurality of circuits for the magnets, a master-switch for individually connecting and disconnecting these circuits and a source of supply of current, means adapted to include the magnets in one of the said circuits and to shift each magnet when it has operated to the other circuit, and a magnet in the motor-circuit adapted to check the flow of current through the other magnets when the main current exceeds a desired amount; substantially as described.

11. In a control system for electric motors, the combination of a number of magnets controlling contacts in the motor-circuit, a plurality of circuits for these magnets, a master-switch for connecting and disconnecting these circuits and a source of supply of current, means adapted to include the magnets in one of the two circuits and to shift each magnet when it has operated to the other circuit, and means at the master-switch adapted to interrupt one of the said circuits without interrupting the other circuit; substantially as described.

12. In a control system for electric motors, the combination of a number of magnets controlling contacts in the motor-circuit, actuating and maintaining circuits for these magnets, a master-switch for connecting and disconnecting these circuits and a source of supply of current, means adapted to include the magnets in one of the said circuits and to shift each magnet when it has operated to the other circuit, means at the master-switch adapted to interrupt one circuit without interrupting the other circuit, and an automatic switch actuated by the current in the motor-circuit and adapted to interrupt the actuating-circuit; substantially as described.

13. In a system of electrical control, the combination of a master-switch, a number of resistance-controlling magnets, an actuating-circuit and a maintaining-circuit for the magnets, means whereby the magnets are successively included in the actuating-circuit and shifted to the maintaining-circuit, and resistance devices in the said circuits adapted to maintain the resistance of said circuits at the same value during operation of successive magnets; substantially as described.

14. In a control system for electric motors, the combination of a number of magnets adapted to control contacts in the motor-circuit, actuating and maintaining circuits for these magnets, switches in the actuating and maintaining circuits moved by said magnets, the switches of the several magnets being constructed to include a succeeding magnet in the actuating-circuit and to include its own magnet in the maintaining-circuit as the magnets are successively operated, and a master-switch for connecting and disconnecting the said two circuits and a source of supply of current for opening one of said circuits without affecting the other; substantially as described.

15. In a control system for electric motors, the combination of a number of magnets adapted to control contacts in the motor-circuit, actuating and maintaining circuits for these magnets, switches in the actuating and maintaining circuits moved by said magnets, the switches of the several magnets being constructed to include a succeeding magnet in the actuating-circuit and to include its own magnet in the maintaining-circuit as the magnets are successively operated, a magnet adapted to connect the motors in multiple, and a master-switch for connecting and disconnecting the said circuits and a source of supply of current, means actuated with the last of said number of magnets arranged to interrupt the maintaining-circuit of said magnets and to establish a circuit through the magnet operating the multiple switch and to reëstablish the said actuating-circuit; substantially as described.

16. In a control system for electric motors, the combination of a number of controlling-magnets, actuating and maintaining circuits therefor, a magnet adapted to connect the motors in multiple, means actuated by said controlling-magnets and adapted on the operation of the successive magnets to include a succeeding magnet in the actuating-circuit and to include the actuated magnet in the maintaining-circuit, means actuated with one of the last of said magnets and adapted to interrupt the maintaining-circuit and to establish thereby the circuit of the multiple magnet, means actuated with the multiple magnet and adapted to reëstablish the said actuating-circuit, and a master-switch having contacts connected with said controlling-magnets and with the multiple magnet, whereby on establishing the connection of said master-switch with the circuit of the multiple magnet the said controlling-magnets are successively operated, then released, the multiple magnet operated and the controlling-magnets again successively operated; substantially as described.

17. In a control system for electric motors, the combination of a number of controlling-magnets, actuating and maintaining circuits therefor, a magnet adapted to connect the motors in multiple, and means actuated by said controlling-magnets and adapted on the operation of the successive magnets to include a succeeding magnet in the actuating-circuit and to include the actuated magnet in the maintaining-circuit, means actuated with one of the last of said magnets and adapted to interrupt the maintaining-circuit and to establish thereby the circuit of the multiple magnet, means actuated with the multiple magnet and adapted to reëstablish the said actuating-circuit, a master-switch having contacts connected with said controlling-magnets and with the multiple magnet, whereby on establishing the connection of said master-switch with the circuit of the multiple magnet the said controlling-magnets are successively operated, then released, the multiple magnet operated and the controlling-magnets again successively operated, and an automatic switch actuated by the current in the motor-circuit and adapted to check the current in the actuating-circuit of the controlling-magnets when the current for the motors exceeds a desired amount; substantially as described.

18. In a control system for electric motors, the combination of a number of controlling-magnets, a multiple-switch magnet, and a multiple governing-magnet, and an automatic switch actuated by the current in the motor-circuit and adapted to check the current in the circuit of said multiple governing-magnet when the current for the motors exceeds a desired amount; substantially as described.

19. In a control system for electric motors, the combination of a number of controlling-magnets, a multiple switch and magnet, and a multiple governing-magnet, an actuating-circuit for the controlling-magnets, means for actuating the multiple governing-magnet by the said actuating-circuit, and means for maintaining the multiple governing-magnet independently of said actuating-circuit; substantially as described.

20. In a system of electrical control, the combination with a controlled motor, and its circuit, of a master-switch, actuating and maintaining circuits independent of the motor-circuit and controllable individually by the master-switch, contact-controlling magnets adapted to be energized thereby, and means whereby said contacts are operated first by the actuating-circuit and are then held by the maintaining-circuit; substantially as described.

21. In a system of electrical control, the combination with a controlled motor and its circuit, of a master-switch, controlling-magnets and actuating and maintaining circuits independent of the motor-circuit and individually extending from the switch; substantially as described.

22. In a system of electrical control, the combination with a controlled motor and its circuit of a master-switch, controlling-magnets, and actuating and maintaining circuits independent of the motor-circuit and extending from the master-switch, and means for interrupting the actuating-circuit at the master-switch without interrupting the maintaining-circuit; substantially as described.

23. In a system of electrical control, the combination of a number of magnets controlling contacts, a master-switch, actuating and maintaining circuits for the magnets individually connected with the master-switch, means whereby the magnets are successively included in the actuating-circuit and again excluded therefrom when they have been operated, and means for maintaining said contacts; substantially as described.

24. In a system of electrical control, the combination of a number of magnets controlling contacts, a master-switch, a plurality of circuits individually extending from the master-switch to the magnets, part of said circuits being arranged to successively actuate said contacts, and another part of said circuits being arranged to maintain them after being actuated; substantially as described.

25. In a control system for electric motors, the combination of a number of magnets controlling contacts in the motor-circuit, a master-switch, and a plurality of circuits for the magnets individually controllable by the master-switch and adapted to be connected thereby with a source of supply of current; substantially as described.

26. The combination with a motor-controller having a series of separate contacts, of an actuating-circuit controlled by the respective contacts and adapted to effect automatically progressive operation of the contacts, a master-switch controlling said circuit, and means at the master-switch for arresting the progression of the contacts without releasing the contacts already operated; substantially as described.

27. In a system of electrical control, the combination of a number of magnets controlling contacts, a master-switch, an actuating-circuit controlled by the respective contacts and adapted to effect automatically progressive operation of the contacts, a maintaining-circuit in which the magnets are included after their respective contacts are actuated, and means controlled by the master-switch for opening the actuating-circuit without affecting the maintaining-circuit; substantially as described.

28. In combination, a plurality of motors, resistances, a plurality of separately-actuated contact devices for controlling the acceleration of said motors, said contact devices including resistance-controlling contacts and series and parallel controlling contacts, and means for effecting automatic progression of said contact devices so as to connect the motors in series with the resistance in circuit, then to cut out said resistance, then to connect the motors in parallel with the resistance in circuit, and then to cut out said resistance.

29. In combination, a plurality of motors, resistances, a plurality of separately-actuated contact devices for controlling the acceleration of said motors, said contact devices including resistance-controlling contacts and series and parallel controlling contacts, means for effecting automatic progression of said contact devices so as to connect the motors in series with the resistance in circuit, then to cut out said resistance, then to connect the motors in parallel with the resistance in circuit, and then to cut out said resistance, and means for arresting the progression of said contact devices at any desired point.

30. In combination, a plurality of motors, resistances, a plurality of separately-actuated contact devices for controlling the acceleration of said motors, said contact devices including resistance-controlling contacts and series and parallel controlling contacts, means for effecting automatic progression of said contact devices so as to connect the motors in series with the resistance in circuit, then to cut out said resistance, then to connect the motors in parallel with the resistance in circuit, and then to cut out said resistance, means for arresting the progression of said contact devices at any desired point, and means for maintaining the contact devices already operated.

31. In combination, a plurality of motors, resistances, a plurality of separately-actuated contact devices for controlling the acceleration of said motors, said contact devices including resistance-controlling contacts and series and parallel controlling contacts, means for effecting automatic progression of said contact devices so as to connect the motors in series with the resistance in circuit, then to cut out said resistance, then to connect the motors in parallel with the resistance in circuit, and then to cut out said resistance, and means controlled by the current in the motor-circuit for arresting the progression of the contact devices.

32. In combination, a plurality of motors, resistance, a plurality of separately-actuated contact devices for controlling the acceleration of said motors, said contact devices including resistance-controlling contacts and series and parallel controlling contacts, electromagnets controlling the operation of said contact devices, and means for automatically effecting the successive energization of said magnets so that the contact devices are operated to connect the motors in series with resistance in circuit, then to cut out said resistance, then to connect the motors in parallel with resistance in circuit, and then to cut out said resistance.

33. In a system of control, the combination of a group of successively-operating contact devices, means for effecting their automatic progression, a master controlling device, and a controlling system operatively connected to said master controlling device and adapted by a movement of the master controlling device to arrest the progression of said contact devices and to maintain the contact devices already operated.

34. In a system of control, the combination of a group of successively-operating contact devices, means for effecting their automatic progression, a master controlling device, and a controlling system comprising actuating means and maintaining means individually connected to said master controlling device, whereby the progression of said contact devices may be arrested without interfering with the maintaining means for the contact devices already operated.

35. In a system of control, the combination of a plurality of translating devices, controlling-switches for said translating devices comprising a number of successively-operating contact devices, a contact device for connecting said translating devices in multiple relationship, and means actuated with one of said successively-operating contact devices for controlling the operation of the multiple contact device.

36. The combination with a motor-controller having a series of separately-actuated contact devices, of actuating means controlled by the respective contact devices and adapted to effect automatic progression of the contact devices, a master controlling device controlling said actuating means, and means at the master controlling device for arresting the progression of the contact devices without releasing the contacts already operated.

37. A motor-controller comprising a series of separately-actuated contact devices, an actuating system therefor, means whereby the operation of each of certain contact devices is controlled by a preceding contact device in the series, a maintaining system for said contact devices, and means independent of the current in the motor-circuit for rendering said actuating system inoperative without affecting the operation of said maintaining system.

38. A motor-controller comprising a series of separately-actuated contact devices, actuating means therefor, means whereby the operation of each of certain contact devices is controlled by a preceding contact device in the series, maintaining means for said contact devices, a master controlling device, and means connected with said master controlling device for rendering said actuating means inoperative without affecting the operation of said maintaining means.

39. In a controlling system for a plurality of electric motors having resistance elements primarily in circuit therewith, the combination with a manually-operated master controlling-switch for establishing initial controlling connections, of a plurality of motor-circuit switches including resistance-controlling and series and multiple controlling contacts, a series of controlling-magnets for said switches, and a plurality of auxiliary switches operated in conjunction with corresponding motor-circuit switches and severally connected to the actuating-coils of different controlling-magnets, whereby the corresponding motor-circuit switches are closed progressively and automatically through series and parallel relationship of the motors without movement of the master controlling-switch.

40. In a controlling system for railway vehicles or trains, the combination with a plurality of motors, of a plurality of motor-circuit switches, controlling-magnets therefor, means for energizing said magnets, a manually-operated master controlling-switch, a controlling-circuit, a source of current-supply for said circuit, and a series of auxiliary switches the actuating-coils of which are in said controlling-circuit, said auxiliary switches coöperating with the motor-circuit switches to effect automatic speed acceleration of the motors through series and multiple relationship when the master controlling-switch is in a given position.

41. In a controller, the combination of a plurality of separately-actuated switches, magnets for controlling the operation thereof, an actuating-circuit in which the magnet-coils are successively inserted, compensating resistances in said actuating-circuit, a maintaining-circuit, means for shifting said coils from the actuating to the maintaining circuit, and compensating resistances in said maintaining-circuit.

42. In a controller, the combination of a plurality of separately-actuated switches, electromagnets for controlling the operation thereof, actuating and maintaining circuits for the magnet-coils, means whereby the magnet-coils are successively inserted in the actuating-circuit and then cut out of said actuating-circuit and inserted in the maintaining-circuit, and compensating resistances in said circuits for the purpose of maintaining the current in each circuit substantially uniform irrespective of the number of coils connected in circuit.

43. In a controller, the combination of a plurality of separately-actuated switches, electromagnets for controlling the operation thereof, a common actuating-circuit in which the magnet-coils are inserted successively, a maintaining-circuit in which said magnet-coils are connected in series with each other, compensating resistances for the magnet-coils, and means for automatically changing the relation of the coils and the compensating resistances.

44. In a control for electric motors, the combination of a plurality of magnet-operated switches actuated by a common circuit, and compensating resistances inserted in or withdrawn from the controlling-circuit by the movement of the magnet-switches.

45. In a controller, the combination of a plurality of separately-actuated switches, electromagnets for controlling the operation of said switches, means for energizing said magnets successively, a maintaining-circuit in which the magnet-coils are inserted in series with each other, compensating resistances in said maintaining-circuit each corresponding to a magnet-coil, and means for cutting out the resistances as the magnet-coils are inserted, so as to maintain the resistance of said circuit substantially the same independent of the number of coils connected in circuit.

46. In a controller, the combination of a plurality of separately-actuated switches, electromagnets for controlling the operation of said switches, an actuating-circuit for the magnet-coils, means for connecting the coils successively in said actuating-circuit to successively operate said switches, means for maintaining said switches after they have been operated, compensating resistances in said actuating-circuit, each resistance corresponding to a magnet-coil, and means for cutting out the compensating resistance corresponding to a certain magnet-coil while that coil is connected in the circuit.

47. In a system of motor control, the combination of a plurality of motors, controlling-switches for said motors including resistance-controlling and series and multiple controlling contact devices, and a multiple governing-relay controlling the operation of said multiple contact device.

48. In a system of motor control, the combination of a plurality of motors, controlling-switches for said motors including resistance-controlling and series and multiple controlling contact devices, means for effecting automatic progression of said switches, and a multiple governing-relay controlling the operation of said multiple contact device.

49. In a system of motor control, the combination of a plurality of motors, controlling-switches for said motors, including resistance-controlling and series and multiple controlling contact devices, means for effecting automatic progression of said switches, a multiple governing-relay controlling the operation of said multiple contact device, and means operated with one of said resistance-controlling contact devices for controlling the operation of said multiple governing-relay.

50. In a system of motor control, the combination of a plurality of motors, controlling-switches for said motors including resistance-controlling and series and multiple controlling contact devices, a multiple governing-relay, and a device controlled by the current in the motor-circuit for checking the operation of the multiple governing-relay when the current in the motor-circuit exceeds a predetermined value.

51. In a system of motor control, the combination of a plurality of motors, controlling-switches for said motors including resistance-controlling and series and multiple controlling contact devices, a master controlling device, means controlled from the master controlling device for effecting the closing of the series contact device and the automatic progression of the resistance-controlling contact devices, and means controlled from the master controlling device and from one of the resistance-controlling contact devices for effecting the opening of the series and resistance-controlling contact devices and the closing of the parallel contact device or contact devices and the automatic progression of the resistance-controlling contact devices.

In testimony whereof I have hereunto set my hand.

GEORGE H. HILL.

Witnesses:
   A. E. WALLACE,
   THOMAS W. BAKEWELL.